(12) United States Patent
Samid

(10) Patent No.: US 10,965,460 B2
(45) Date of Patent: Mar. 30, 2021

(54) ROBUST SECURITY TECHNOLOGY FOR COUPONS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/001,163

(22) Filed: Aug. 24, 2020

(65) Prior Publication Data

US 2020/0403793 A1    Dec. 24, 2020

Related U.S. Application Data

(63) Continuation of application No. 16/855,517, filed on Apr. 22, 2020, now Pat. No. 10,790,977, and a continuation of application No. 16/687,690, filed on Nov. 19, 2019, now Pat. No. 10,673,822, which is a continuation of application No. 16/444,892, filed on Jun. 18, 2019, now Pat. No. 10,523,642.

(51) Int. Cl.
*H04L 9/12*     (2006.01)
*H04L 29/06*    (2006.01)
*H04L 9/08*     (2006.01)

(52) U.S. Cl.
CPC .............. *H04L 9/12* (2013.01); *H04L 9/0891* (2013.01); *H04L 63/0407* (2013.01); *H04L 63/0471* (2013.01)

(58) Field of Classification Search
CPC ....................................... H04L 9/12
See application file for complete search history.

(56) References Cited

U.S. PATENT DOCUMENTS

2013/0117087 A1*  5/2013  Coppinger ......... G06Q 30/0207
                                               705/14.26
2017/0061397 A1*  3/2017  Lee ...................... G06Q 20/36

* cited by examiner

*Primary Examiner* — Bradley W Holder

(57) ABSTRACT

This invention provides merchants the capability to mint store credit as a secure physical handheld coin, resisting fraud and counterfeiting. It is based on a technology that marks the physical handheld coins with a large number of features, the reading of these features representing an assigned unique identity or signature, an assigned nominal monetary value, and assigned limitations of use, all verifiable through blockchain technology. This secure physical handheld coin, as well as a secure digital coin, may be cash-redeemable, and use-trackable to leverage the store's credibility to push its loyalty currency into the wallets of the public and win more customers.

8 Claims, 7 Drawing Sheets

ϱcoin Verifier top and bottom assembly

Assorted ǫcoins of various denominations

ROBUST SECURITY TECHNOLOGY FOR COUPONS

CONTINUATION OF U.S. PATENT APPLICATION SER. NO. 16/855,517

Which is a continuation of application Ser. No. 16/687,690, which is a continuation of application Ser. No. 16/444,892.

THIS DEFINES A CONTINUATION ZONE ENCOMPASSING THE CURRENT APPLICATION AND APPLICATIONS Ser. Nos. 16/855,517, 16/687,690, 16/444,892, AND ALL THE PROVISIONAL APPLICATIONS REFERENCED IN application Ser. No. 16/444,892, CROSS REFERENCED HERE:

Provisional Application #62688387 filed on Jun. 22, 2018; Provisional Application No. 62/689,890 filed on Jun. 26, 2018; Provisional Application #62714735 filed on Aug. 5, 2018; Provisional Application No. 62/782,301 filed on Dec. 19, 2018; Provisional Applications No. 62/805,369 filed on Feb. 14, 2019; Provisional Application No. 62/813,281 filed on Mar. 4, 2019; Provisional Application No. 62/782,301 filed on Dec. 19, 2018; Provisional Application No. 62/813,281 filed 4 Mar. 2019; Provisional Application No. 62/850,720, filed May 21, 2019; Provisional Application No. 62/857,898 filed 6 Jun. 2019.

BRIEF SUMMARY OF THE INVENTION

This invention is based on a new technology to mint coupons and loyalty currency in a format that will maintain the hand-deliverability of the coupons, while providing top notch security that will allow merchants to mint physical coupons with high denomination of store credit, not concerned of fraud or counterfeiting. This combination of paying money cash-like, with no need to identify the payee, nor to identify the payor, and the super security offered by the essential technology in this invention, creates opportunities that are not present today, not available to stores and merchants. The robust security of the physical coupon will be the basis of endless creative and imaginative ways for merchants to lure more customers to their outlets. The novelty herein is re-imagining coupons as a secure physical entity, physically coin-like. The physical coupon is marked with a large number of features the reading of which constitutes a 'signature' which may be verifiable through blockchain technology.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Merchants around the country promote their business with coupons, also known as loyalty money, or store credit. Aggressive distribution of such coupons brings in new customers and activates old customers. But unlike the US Dollar which is minted with top-notch secure technology, store coupons are paper printed, and recently tokenized into bit strings. In both modes these coupons are an attractive target for hackers because after all, a coupon has money equivalence, but it is minted with lax technology, easy to crack. As a result businesses lose fortunes as fake coupons claim merchandise. The industry is desperate for coupon technology that would allow stores to mint store credit coupons that will withstand fraud and counterfeiting. These coupons must also be minted such that they would be readily hand-deliverable to groups and crowds. This security need is the background for this invention.

The figure shows a 2D cut of the top side of the ρCoin with the array of ports shown. A matching Verifier array of pins is shown for both the top and the bottom parts. The ρCoin shows identification of the mint (Φ), the denomination of the coin, ($100.00), the issuing store, (X), and the coin id.

Figure 1:
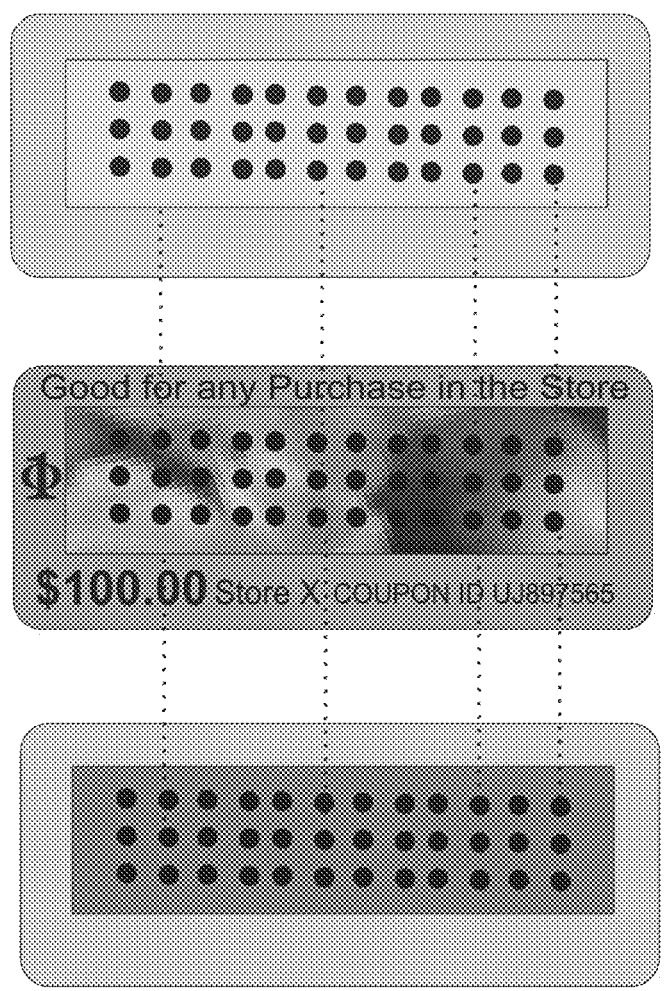
FIG. 1 ρCoin and top and bottom verifier
Figure 2:
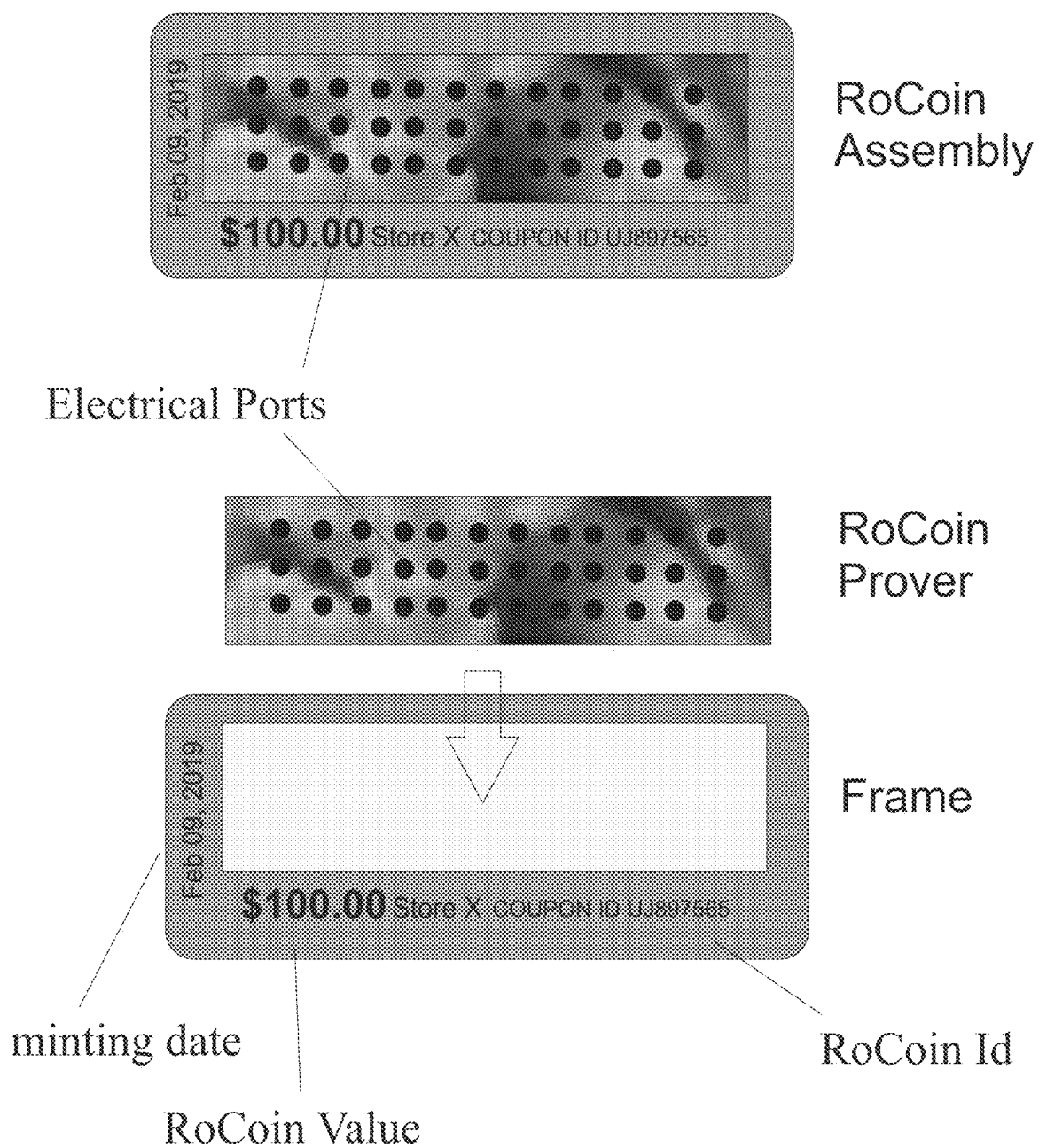

FIG. 2 ρCoin Components

Figure shows the full assembly of the "rock" ("prover") part fitted into the Frame where the mint id, the denomination and the id are marked. Below it shows the parts separated. The "rock" with its ports, and the frame with the space to fit the rock.

Figure 3:
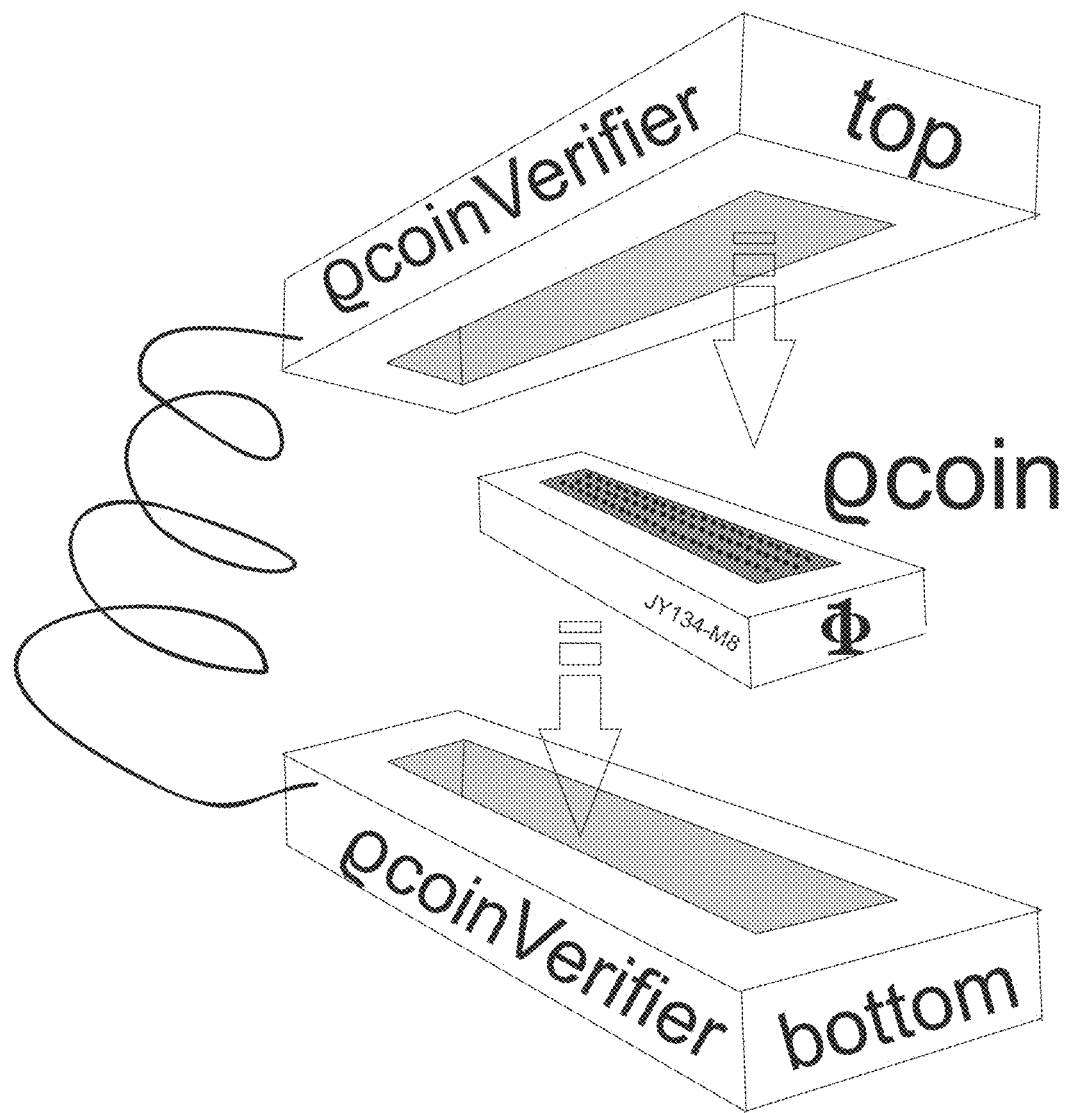

FIG. 3: ρCoin Verifier top and bottom assembly

Figure shows how the two parts of the ρCoin-Verifier are built to house the ρCoin and measure its parameters through the Verifier pin fitting into the Prover rock.

Figure 4:
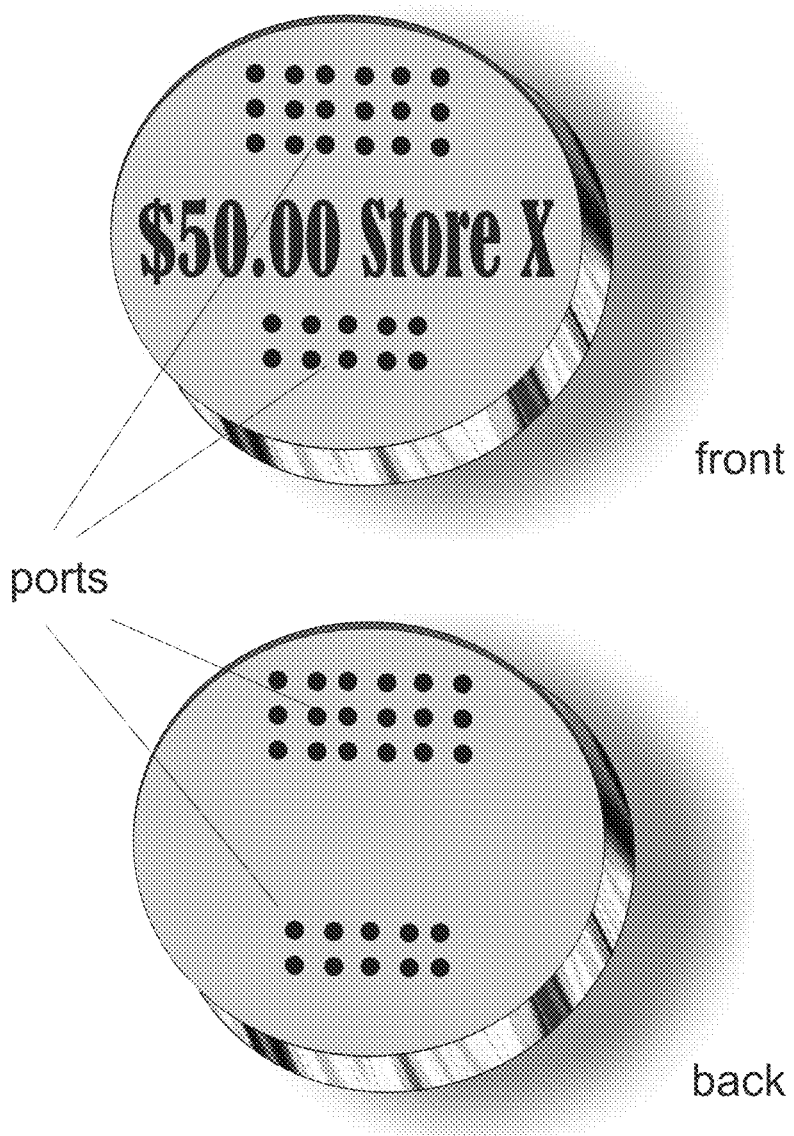

FIG. 4: Secure Physical Coven

The figure shows the two faces of a hybrid coin where the shell is built as a "rock of randomness" with ports that allow a ρCoin-Verifier to ascertain the bona fide status of the coin.

Figure 5:
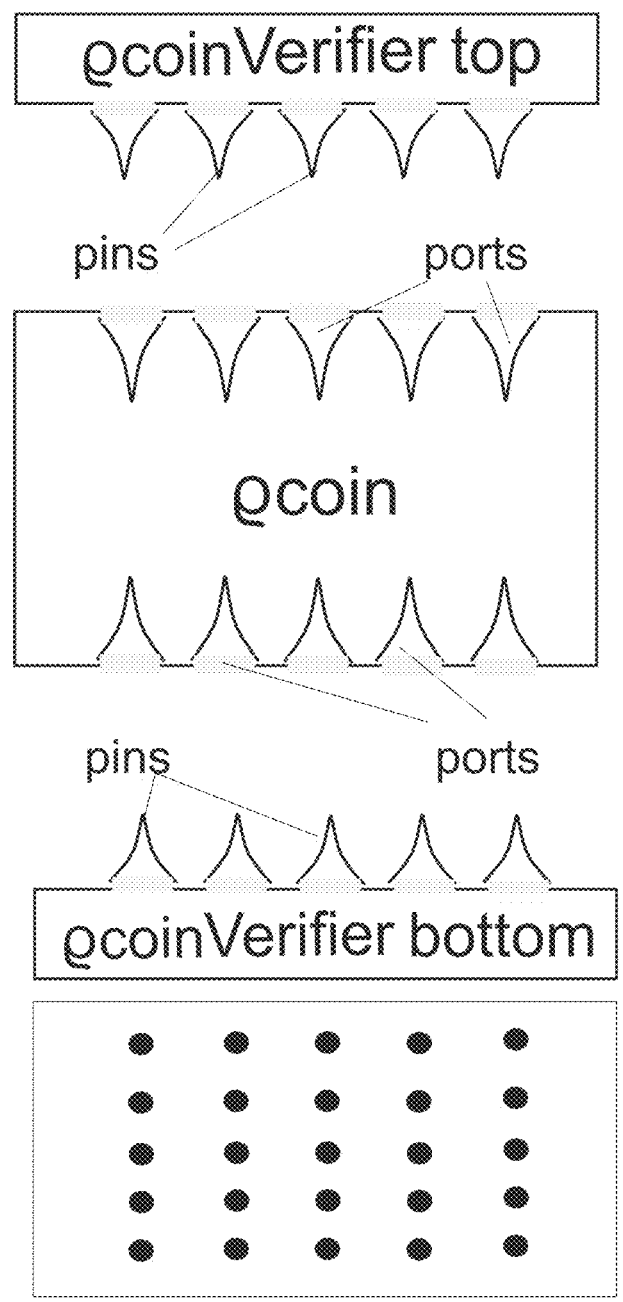

FIG. 5: RockCoin and Verifier Configuration

The figure shows the configuration between the up an down pins arrays of the ρCoin-Verifier and the ports arrays (up and down) of the ρCoin. The bottom part shows the flat view of both the ports and the pins.

Figure 6:
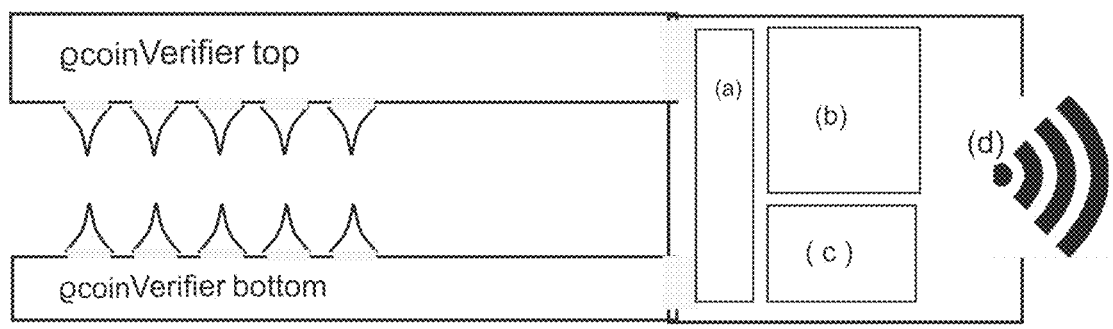

FIG. 6: ρCoin Verifier Components

The figure shows the pin arrays of the verifier (not to scale). It shows schematically component (a) which is the circuitry and the logic that measures the ρCoin fitted for measurements. It runs through the various pin pairs, computes the resistance measurements to a binary string, then accumulates the individual string to the full coin string. It then compares the measurement to the record of that coin in its own (downloaded) copy of the full mintage of the mint. (b). Part (c) represents the dynamic memory where the Verifier logic records activity log and any other measurement parameters. Part (d) is the WiFi section that communicates with the Mint. Not all Verifiers have all the shown components.

Figure 7:
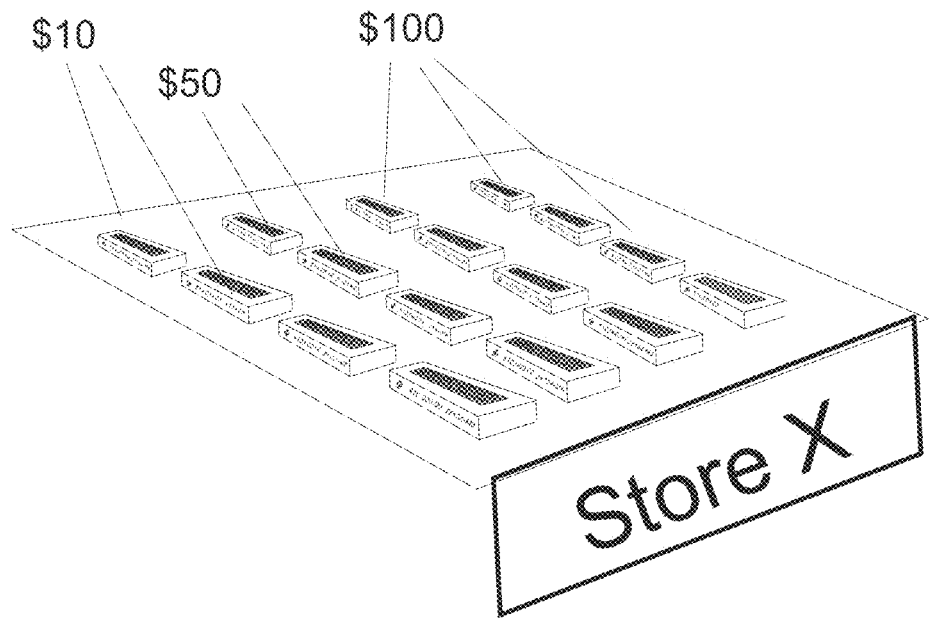

FIG. 7: Coupons Sheet

The figure shows a sheet where several ρCoins are fitted. Assorted coins of different denominations. Each can be plugged out and paid individually.

DETAILED EXPLANATION OF THE INVENTION

Introduction

Merchants commonly energize their business through coupons and loyalty vouchers. Today this action faces a formidable security challenge. Loyalty money, unlike fiat money, is manufactured as paper bills, and tokenized strings, both are very easily counterfeited and subject to fraud. This invention proposes to invigorate the coupons and loyalty money business by minting this money in secure hardware. The security is robust enough to suppress fraud and counterfeiting, but more importantly—a secure physical coin can be passed around, as a thing of value. This "passing around" is key since it opens the door for merchants to incentivize their customers to hand out store coupons to new customers. We believe that a secure physical coupon will be a basis for a variety of viral schemes in which a merchant will prop up its business.

The newly achieved security level will allow for the value of the dispensed coupons to be much higher than it is now. Creating ever-new opportunities for stores and merchants.

The described secure physical coupons are based on Applications 62/805,369 and 62/857,898 that were referenced in application Ser. No. 16/444,892 of which this application is a continuation.

The main thrust of this invention is security through robust physical embodiment of loyalty money. Security is key—it allows a merchant to mint many coupons in ever larger denominations, and create a lively trade and distribution. The coupons are not bits therefore they are not hackable. The coupons are not printed papers—therefore they will not be counterfeited. Physical coupons are easily handed over to a friend or a stranger alike. They can spread around in crowds and gathering, and since these coupons come to full value only in the minting store, all this spread and distribution will translate to more customers and more business.

The Secure Physical Coupon

The intrinsic problem with digital money is its bit-expression. Bits—wherever stored—are readily copyable, stealable, hackable. Bit-territory is infested with high power bit-assailants, leaving no bit-expression safe. And when the bits express money they become a very juicy target indeed. Presenting a solution based on de-bitting money. Keeping information off the digital grid. The Rock of Randomness—the "Rock"—keeps randomized information implicitly, captured in its chemical structure. To read this information one needs to have possession and physical access to the 'rock'. Counterfeits are infeasible. Money first emerged as solid metal measured by weight. It developed into flimsy banknotes, and then to counterfeit-prone digital expression. Now we turn a full circle: digital physical coins. The first version thereto is captured in U.S. Pat. No. 9,471,906, and the more robust coin is based on the "rock of randomness" technology, see publication by the Material Research Society.

While adoption of new money technology on a national basis is a long and arduous process, the use of a new technology by a merchant issuing credit for store purchase, is a much more palatable proposition. Store redeemed money is not universal currency, but it is money nonetheless. When money is mentioned herein, the intent is to represent coupons, store money, loyalty currency, not national fiat currency. Reference to "mint" or to "BitMint" are to be construed as store mints, and merchant's BitMint.

RockCoins ($\rho$Coin): BitMint Coins Type II

BitMint coins Type I are described in U.S. Pat. No. 9,471,906. Here we describe Type II. BitMint mint will publish loyalty currency coins type II in some agreed upon denominations, each denomination will be minted in a prescribed amount. The coins are readable, and verifiable—transactable. They are passed from hand to hand, like old fashioned coins. And they are counterfeit resistant.

$\rho$Coin are designed to be used primarily for large denominations, but can be used for any denomination. They come in various sizes for various denominations. BitMint $\rho$Coin can be registered to an owner, can be placed in a physical wallet, a box, a safe. They are easily carried and handled by hand.

$\rho$Coins are minted in some similarity to regular (non materialized) BitMint coins where a 'capsule' (frame) houses a 'payload' (a "rock of randomness"). The $\rho$Coin identification and various parameters data is marked on the capsule. The marked data is written electronically such that when the coin is placed in a coin-reader ($\rho$Coin-Verifier) the reader can read it. Some or all of this data is marked on the capsule for human readability. The heart of the $\rho$Coin is the payload. The BitMint payload is a bit string comprised of some v bits. The identity of the $\rho$Coin is expressed via the exact identities of v bits of the payload. These v bits are captured not in a bit format, but rather in the chemical structure of the physical $\rho$Coin.

A payer presents the $\rho$Coin to the payee. The payee fits the $\rho$Coin in a $\rho$Coin-Reader ($\rho$Coin-Verifier). The $\rho$Coin-Reader reads the marked 'capsule' data and in parallel reads the payload data captured in the chemical structure of the $\rho$Coin.

When the $\rho$Coin is read, the $\rho$Coin-Reader will either send the data to a third unit to complete the verification, or it will compare the reading to a copy of the public ledger that lists all the minted coins (the mintage). Alternatively the $\rho$Coin-Reader (Verifier) will be connected online to the BitMint database, (ledger), and retrieve the bit expression of that coin from that database to compare to the readings from the coin. If the $\rho$Coin data (capsule+payload) is consistent with the $\rho$Coin-Ledger, then the payee trusts that the coin is valid, and that the BitMint mint will pay the nominal value of the $\rho$Coin when the $\rho$Coin is redeemed. The payee will then accept possession of the $\rho$Coin as payment per its nominal value. Each coin per its id will have a different (randomized) string of v bits. The identities of these v bits will affirm the identity and validity of the RockCoin.

Basic $\rho$Coin Life Cycle

A BitMint customer wishes to buy a $\rho$Coin of a given denomination of $X. The customer conveys the nominal amount ($X) to the BitMint mint, and receives in return a $\rho$Coin where the capsule part is marked on the $\rho$Coin in a readable way, and the payload is marked according to the Rock of Randomness technology. The buyer takes the physical $\rho$Coin with him to safe keep.

At some point in the future the buyer wishes to use the $\rho$Coin as payment. He or she will then pass the $\rho$Coin to the designated payee. The payee will fit the $\rho$Coin in the $\rho$Coin-Reader and verify its bona fide status before accepting it as payment. The $\rho$Coin then passes from its payer to its payee.

The new holder (owner) of the $\rho$Coin will readily switch to payer status and pass the coin to the next payee. Such trade will continue indefinitely. Each time the payee validates the status of the coin as payable.

Eventually the $\rho$Coin last holder will return it to the issuing store, specifically the redeemer will connect the to the store mint, which will verify it, credit its value to the redeemer (likely with a par value of store merchandise), and then dispose of the redeemed coin. The mint will either discard it, or put in ready mode to pass to the next customer wishing to buy a ρCoin in the same denomination, or perhaps give it away as part of a promotion campaign.

ρCoin Security Advantage

The 3D manufacturing process of the ρCoin is inherently one-way. Much as it is inherently infeasible to repack an egg from an omelet, so it infeasible to manufacture a ρCoin that will conform to pre-set measurements. This implies that even the mint (not just the counterfeiter) cannot construct a ρCoin that would fit into a coin record in the public ledger. The mint is feeding randomized bits to a 3D printer, and as it does so it is clueless as to what measurements to expect. All that the mint can do is to measure the ρCoin as it comes out, and list it. Once the generating randomized-bits are destroyed, there is no way to reproduce the ρCoin.

Theoretically a holder of a coin could use a destructive process to study the material construction of the coin, and duplicate it. Alas, this process requires possession of the original coin; it requires it destruction (and hence loss of its value), and thus one will have to construct at least two counterfeit coins to benefit from the fraud. The effort to destroy and duplicate is proportional to (i) the physical size of the coin, and (ii) exponentially related to the resolution of the material assembly. That means that the mint can adjust the physical parameters of the coins relative to their denominated value, to make it unprofitable to attempt a counterfeit.

RockCoin (ρCoin) Assembly: Description and Structure

The ρCoin Assembly is comprised of the ρCoin and the ρCoin-Verifier. The ρCoin Verifier is applied to the ρCoin in order to verify its validity.

The ρCoin is comprised of the ρCoin Prover (the ρCoin-"Rock") and its frame. The ρCoin Prover (the 'rock') is comprised of a unique composite of chemicals that carry coin identity data, not in the usual form of strings of bits, but rather as complex chemical properties of the material assembly of the ρCoin Rock. The technology of the Rock is the one described in the "Rock of Randomness" in patent application Ser. No. 15/898,876], adapted to the purpose at hand. The ρCoin Prover (the "rock") is fitted in a frame designed to make handling convenient, and to serve as a writing board for information related to the ρCoin.

RoCoin Prover (the "Rock")

The ρCoin Prover is comprised of a solid 3D printed complex assembly ("rock") of materials fitted with p "ports", a "port" being a spot on the surface of the rock onto which an electrical contact can be attached. 2m of these ports are regarded as "money ports" or "published ports", and the balance of 2s ports are regarded as "security ports" or "unpublished ports". We have then: p=2m+2s.

The ρCoin rock is a physical embodiment of money minted by the manufacturing mint. Using the basic BitMint money language, the denominated value of the ρCoin, V, is represented by v bits of unique identities. These v bits are represented through the "rock of randomness" mechanism through readings of resistance values. The reading of the v "money bits" will be carried out by the ρCoin Verifier, when the ρCoin is fitted into it. The ρCoin-Verifier is fitted with p arrayed pins designed to fit into the ρCoin-rock ports. The values of these v money bits is published in the public domain, allowing the ρCoin verifier to ascertain that the tested ρCoin is indeed the properly minted coin.

The 'rock of randomness' method of reading data in the rock (the ρCoin) is also applied over the 2s security ports, only that these readings are not published.

The bit readings over the ports can be done in various ways, one option is described ahead.

RockCoin Symmetric Port Reading

The symmetric ρCoin port reading can be carried out over the money (published) bits and over the security (unpublished) bits. It proceeds as follows:

The reading is carried out over 2n ports arrayed such that n ports are marked on one side of the 'rock' and the other n ports are arrayed on the opposite side of the rock. Each array of n ports is properly ordered 1, 2, . . . n.

Reading is carried out by selecting port i (i=1, 2, . . . n) from one set of n ports and port j (i=1, 2, . . . n) from the opposite array of n ports. Electrical voltage (EV), is being set between these two ports. It results in a current I(i,j) to flow between same ports. This flow allows one to compute the effective resistance between ports i and j, R(i,j). The 'rock of randomness' methodology then maps the R(i,j) reading to a number ρ(i,j) between a value 0 and a maximum reading, $2^h-1$: $0 \leq \rho \leq 2^h-1$. ρ(i,j) is expressed through a bit string of length of h bits. There are $n^2$ possible (i,j) pairs, which amounts to reading $hn^2$ bits by measuring exhaustively all the combinations of (i,j) pairs.

Applied to the money bits (n=m), one could express the string of v bits that represents the money embodied in the tested ρCoin, we have $v \leq hn^2$.

The money bits coin reading happens by sequentially stepping forward first the i-count (the count of the port in one array) keeping the j-count fixed (the count of the port in the opposite array), and when all the i values have been used: i=1, 2, 3, . . . n, then advancing the j-count by one, and again measuring all i-ports against that j-port. And so on until all the measurements of the $m^2$ pairs are sequentially measured.

The choice of which port to apply the voltage to, is made by the choice of connection "wires". A port that is placed in row u and column v will be activated (voltage applied) by targeting row u and column v as a combined signal to flip the gate on the RockCoin Verifier and activate that port. Other common methods to activate a given point in an array are also usable.

Illustration: Let a certain ρCoin represent $1000. It is written in the basic BitMint way where each cent is expressed via a 5 bits string of particular identity. The total number of money bits, v, will be: v=5*1000*100=500,000. The ρCoin is fitted with 2m=500 money bits ports, in two arrays of 250 ports each. The arrays are organized in a rectangular (matrix) order in 10 rows and 25 columns. These two arrays define 250*250=62,500 pairs to measure ρ values for. The ρ measurements are bounded by: $0 \leq \rho \leq 255 = 2^8-1$, and hence are listed as h=8 bits per ρ measurement. In total the reading of all 62,500 measurements define a bit string comprised of 62500*8=500,000 bits, which is exactly the number of bits (v) that comprise the identity of that coin.

The ρCoin Verifier will apply electric voltage EV to the $m^2$ pairs of ports in an agreed upon order so that the resultant measured bit string of v bits will conform to the order of the bits as minted. Since the values of these v bits is published for public exposure, the ρCoin-Verifier will be able to measure the tested ρCoin and confirm that its reading is what it should be if the tested ρCoin is what it claims to be. This is the mechanism for the ρCoin verifier to verify the claim of the ρCoin for authenticity.

Measuring the bit strings for the security bits is carried out in a similar way, except that the protocol calls for a dialogue with the mint. The mint specifies the values of i and j for the two opposite arrays of ports. The ρCoin Verifier measures and computes the ρ(i,j) for this pair, and submits the reading to the mint. The mint will signal if the submitted measurement is what is expected, or not. Inconsistency raises a warning for a counterfeit, and for coin rejection. The mint may be asked to challenge the ρCoin Verifier with another pair, (repeatedly), until the ρCoin-Verifier is satisfied that the readings submitted to it, is what is expected of that ρCoin per the respective data in the mint secret database. The mint has performed the same reading of that rock before releasing it. The mint keeps the reading in its private secret database. These readings are not published, and used as an extra measure of security. The higher the value of the coin, the more important this security measure.

It is important to note that the mint does not pre-determine the readings of the port pairs, but does itself perform the same reading on the manufactured rock before releasing it.

RockCoin Frame

The ρCoin Frame serves as a housing for the rock-of-randomness, and as a service unit. On one hand the ρCoin Frame is a holding embrace for the rock, it defines the external dimensions and features of the ρCoin assembly. Handles, or hooks are fitted in the frame. The ρCoin rock, the "prover," may be fitted snugly into the frame, or may be secured to it with a glue or otherwise, as the case may be.

The service provided by the Frame is (i) fixed data board, and (ii) dynamic data board. The fixed data board identifies the mint, the id of the coin (some alphanumeric word), the minting date, and any other fixed parameters including the category of that coin. The dynamic data board allows the ρCoin Verifier to inscribe electronically any data regarding verification events, and custodial transfer. This dynamic data will be read by the subsequent verifier, and by the mint when the coin is eventually redeemed.

The term 'category' refers to administrative designation of a ρCoin. Some ρCoins may be freely transacted, others only in designated circles of traders.

The RoCoin Verifier

The ρCoin Verifier is a capsule that is designed to read the data contained in the ρCoin. It may come in different modes. In the simplest form the verifier will read the bit expression of the coin and either display the result, or communicate the reading result in some electronic way to another unit which will use that data to determine if the ρCoin is bona fide.

A more advanced Verifier will have a copy of the public ledger of minted ρCoins. It will then compare the reading of the coin from the ρCoin-Prover (together with the coin id from the ρCoin-Frame) to the data in the public ledger. If the data agrees, the Verifier will signal (e.g. green light) to its handler that the ρCoin passed the test, and should be regarded as bona fide. It will alert the handler in case the data does not agree.

The ρCoin-Verifier will read the data from the ports in the right sequence to compare to the data in the public ledger.

A more advanced ρCoin Verifier will have a copy of the public ledger of minted ρCoin but will also have Internet connection to the BitMint server, to check if there is anything new to learn about the claimed coin. For example, if one constructed a counterfeit coin, copied the right coin id, but was not able to build the rock of randomness to provide the right reading, then a Verifier will flag it out, deny the coin, and eventually report to the mint that someone is trying to pass a counterfeit coin of that ID. That information will be available live to the public. It will be seen by a Verifier with online connection.

The Verifier will be able to add security to its determination, by using its online connection to the BitMint mint. It will ask the BitMint mint to challenge it with a reading of a random pair (i,j) among the secret ports. The readings of p values among the secret ports is not published. (Remember that reading of the money ports is made public). The BitMint mint will select a random pair (i,j) of two ports from the secret ports. The Verifier will read the p value of these ports ρ(i,j) and report the reading to the BitMint mint. The mint will return an OK signal if the reading is consistent with the secret database handled by the BitMint mint, and alert the Verifier if the reading does not agree. In the latter case the Verifier will signal 'rejected' for the ρCoin verification test, and in the former case, it will either be satisfied and conclude the test in a positive conclusion, or according the Verifier policy it will ask the BitMint mint to pick up another random pair (i',j') and go through another round of comparing rock reading with the secret database. The Verifier will run as many rounds as desired (normally the higher the denomination of the ρCoin the more tests are warranted).

In one particular embodiment the ρCoin-Verifier encloses the ρCoin with a bottom part and a top part. Each of these parts is arrayed with "pinned" electronic connectors designed to fit into the ports marked on the ρCoin-rock. The pins are set such that an external electronic circuitry can at any interval of time $\Delta t$ apply the voltage EV to a column line and a row-line in the pin array. This creates a situation that over that specific time interval $\Delta t$ only a particular pin that is in the cross point of the designated column and designated row is connected to an electric voltage. Over the next $\Delta t$ interval the electronic circuitry of the ρCoin-Verifier will apply the voltage (EV) to the next port in the sequence (in the bottom part or in the top part. This will happen by shifting the row or the column line in the array where the current is applied). Over the next time interval $\Delta t$ another shift will occur, and so on. Over each such time interval ($\Delta t$) the ρCoin-circuitry reads the current, I, between the two designated ports as a result of applying the voltage difference between these ports (EV), and then the electronic circuitry computes the resistance R=EV/I, and from R, computes the bit string ρ. Each $\Delta t$ another string containing the value of the ρ between these two ports (and of fixed length of h bits) is added to the accumulation list of these readings, so the full bit-list of the coin is built, (v bits in total) and then compared to the identity of the coin of the same Id, as recorded in the BitMint database. Only if the fit is perfect is the coin regarded as bona fide.

Illustration: Consider a particular coin with id: P500. Let the money-port for that coin be set in two parts: 3 ports (x,y,z) on one side of the rock, and 2 ports (a,b) on the opposite side of the rock. Note: the nominal description calls for 2m money ports, m ports on one side, and m ports on the other. But this division is for convenience, it is not essential. In our illustration herein we show a non even division of ports. We use for illustration an h value of h=3. Namely the reading of resistance between the i=1, 2, 3 and the j=1, 2 ports R(i,j) will be translated using modular arithmetic (as described in the Rock of Randomness patent application) to a range of ρ(i,j): $0 \leq \rho(i,j) \leq 2^3 - 1 = 7$. The Verifier will measure the R values by order: [a,x], [a,y], [a,z] to represent the resistance measurements between points a-x, a-y, a-z respectively. Ans then respectively [b,x], [b,y], [b,z]. The Verifier will then compute the respective p values. [a,x]=2, [a,y]=4, [a,z]=5, [b,x]=0, [b,y]=6, [b,z]=1, and construct money string v=010 100 101 000 110 001. The Verifier will then compare the measurements with the public ledger that says:

Coin P500: Money String: 010 100 101 000 110 001

The ledger and the measurements are consistent and so the coin is authenticated.

RoCoin Operation

We describe: •ρCoin minting •ρCoin payment and handling •ρCoin redemption •ρCoin accounting RoCoin Minting The BitMint mint will operate under a given plan to mint a certain number of coins of certain denomination, and a different number of a different denomination. For each coin the BitMint mint will decide how many bits will be needed to express the coin, according to the BitMint money language. Based on this number, v, and the known parameters of the rock of randomness, the BitMint mint will determine the number, h, of bits to be interpreted from the row reading of resistance between two money ports on the coin. The ratio v/h will determine the number of pairs of ports (i,j), that will be needed to fit between the reading of the coin, to its coin identity string (comprised of v bits). Accordingly the BitMint will have to fit the ρCoin with two arrays of m money ports, such that $m^2 \geq v/h$.

Based on these calculations the BitMint mint will use the 3D printing specified in the Rock of Randomness technology protocol (see reference) to mint a rock and fit it with 2m ports. When the rock is minted (3D printed) and the ports fitted, the BitMint mint will read the resistance values $R(i,j)=EV/I$ by dividing the applied voltage, EV by the resultant current I, and interpret that R value as a ρ(i,j), a number in the range of 0 to $2^h-1$. Reading from each pair of ports will add h bits to the accumulating string that represents the bit identity of the minted coin, according to the basic BitMint money language. That coin identifying bit string will be kept in a database that holds all the outstanding minted coins. Each ρCoin will be given a unique id identifier, Id, and in summary, the BitMint mint will add a coin entry to its minted coin database which will list the coin Id and the ordered readings of ρ values, stretching into a bit string comprised of $v=hm^2$ bits.

The aggregation of all the minted coins will amount to the ρCoin-database. That database will be made public, and be published in a public ledger so any prospective payee of such coins will be able to secure a fresh copy of the minted ρCoin database in order to execute a verification of a ρCoin brought forth as payment.

For high denominations, a ρCoin will have the option of being further secured through additional sets of ports. These will be security ports (not money ports as before). There will be 2s security ports, set in two arrays of s ports each. They will be interpreted with the same h value and amount to $s^2$ pairs, where each pair is associated with a measured p number in the range of $0 \leq \rho \leq 2^h-1$. These readings will be kept in a separate security database. These readings will not be published. They will be used as extra security measures to prevent counterfeiting.

Once the money ports and the security ports have been properly measured and entered into the respective databases, the 3D printed coin will be fitted into its ρCoin-Frame. The Frame will house the 3D-printed ρCoin-Rock, and in addition serve as data boards. The mint will select a unique id for the ρCoin and mark it on the frame. It will also indicate date of minting and assorted pieces of information for various purposes.

So fitted the ρCoin is then stored in a BitMint vault, ready to be shipped out to any trader wishing to trade with it. Normally a trader will provide the denominated value of the coin to BitMint, and claim the coin in return (some process fees are expected).

ρ Coin Payment and Handling

The minted ρCoin coin is passed along to its purchaser or to a person to whom it is being endowed. We call them both as the "purchaser". In the normal mode there is no registration of the ρCoin to its owner, it is simply the fact of possession that confers the assumption of ownership, like it is with regular cash. The owner is supposed to take care of the ρCoin and hold on to it safely. He is likely to secure a ρCoin-wallet, a location, or a box where to keep this and any other coins so purchased.

The ρCoin-wallet may be secured in a safe, or hidden somewhere. At any time the holder of the ρCoin may decide to pass it along as payment. Unlike a regular BitMint coin which can readily be split to any desired resolution, the ρCoin has to be paid as a whole, for its entire denomination.

The ρCoin is physically handled from payer to payee, like with regular cash. The payee may express trust in the payer, simply accept the ρCoin on visible inspection, and credit the payer for the denominated amount.

Otherwise, the payee will verify the validity of the ρCoin by applying to it a ρCoin-Verifier. This is a device to which the ρCoin is placed. The ρCoin-Verifier measures the readings of the coin through its ports, and then verifies its claim to be the coin that it claims it is by checking the port reading with the published data in the public ledger issued by the mint. If the measurements check out with the database, the payee is convinced that the prospective ρCoin submitted as payment is bona fide. Otherwise, it rejects it as payment.

For high denomination ρCoins the ρCoin-Verifier will add the security check by inviting the mint to select a random pair (i,j) of ports in the security section of the ρCoin. If the security check is successful, the coin is accepted by the payee with high confidence.

This process will repeat itself when the current payee becomes a payer and passes the ρCoin along.

ϕ Coin Redemption

Redemption of ρCoin is not much different than regular passing and payment. The store mint will acknowledge the ρCoin and credit its payer, using the above mentioned ρCoin-Verifier. The redeemed coin can be returned back to circulation or it may be destroyed. The store mint decides how many coins to leave in circulation at which denominations etc.

ρCoin coins may be like cash, of indefinite time validity, or they may come with an expiration date. When the date arrives the coin is no longer acceptable as payment.

If the coin is not timely redeemed, then per policy, its redemption may be denied, or it may be discounted per time of redemption relative to the coin expiration date.

ϕ Coin Accounting

The ρCoin may be transacted in complete anonymity between its original purchaser and its final redeemer, just like cash. Unlike cash, ρCoins may be minted with a marked expiration date. After that date the ρCoin will have to be redeemed at the mint. Late redemption (beyond the expiration date) may, per policy, take place against a reduced redemption value.

Alternatively the coin may be set as a monitored category where the ρCoin-Frame (capsule) will have memory to write into it the full transactional history of the coin. That ρCoin will be redeemed only if the transactional history is in good order.

RoCoin Security

Unlike a regular BitMint coin, the ρCoin is published. It's identity is public knowledge. Its security though is based on the infeasibility of counterfeit, the infeasibility of cheating the BitMint mint by claiming a fake possession.

The inherent security of the ρCoin is the rock-of-randomness technology. The readings of the R (resistance) values between various ports is robustly random. The 3D printing of the ρCoin is a one-way function. That is one prints a ρCoin based on random input to generate a structure with reading values that cannot be pre-calculated but need to be practically measured. It is infeasible for a fraudster to use the published values of the p values and construct a ρCoin-lookalike that has the proper readings through all the ports.

For high denomination coins the security ports will be used to stop fraud. The security readings of various pairs of security ports are not published, so a counterfeiter cannot prepare his counterfeit coin to read the expected values. The design calls for sufficient number of security ports that over the expected life span of the coin (the number of times it changes hands) there will always be new security ports that have not been used in the past. So whenever a verifier will ask the mint to select a pair of security ports to be read, the pair will be new, never selected before for that coin. The fraudster will not be able to prepare a counterfeit coin with the proper readings, which is unknown to him.

The best strategy for a fraudster will be to manufacture a ρCoin, measure it, and then compromise the BitMint database and replace an existing ρCoin data with the fraudulent data. This can be defended against by using write-once technology, since there is never a need to change the reading of any minted coin, as to its identity. In addition off-line copies can be made, hash technology used (even in a layered way, like in blockchain) to render this pathway infeasible.

Duplicate Rock Security

The security of the ρCoin is hinged on its irreproducibility. Once the random sequence used to generate a ρCoin is destroyed, there is no way to duplicate the coin, and hence its security. Normally the mint will take electro-chemical measurements of the coin with which to validate any claim of possession of same coin. An alternative strategy would be to use the same random sequence that generated the original coin to generate a duplicate thereof. The duplicate will be kept with the mint. Then instead of keeping a database of each coin measurements, the mint will keep a "warehouse" of the actual coin duplicates. When someone attempts to pay with the distributed coin, then the ρCoin-Verifier will measure the submitted coin, then will connect with the mint. The mint will then measure the duplicate over the same set of ports, and if the measurements agree then the payment if validated.

This "duplicate rock strategy" has several advantages. (1) there is no bit-database to be compromised. The validation data is kept in the same format as the data of the transacted ρCoin, off the bit-grid. (2) there is no need to check and compare the entire sequence of bits that defines the ρCoin. A much smaller number will give sufficient assurance. The disadvantage here is that validation requires online connection with the mint. The mint could then limit the 'duplicate rock strategy' to some ρCoins and not to others.

GPS Tracking

A ρCoin may be equipped with GPS capabilities. Either in a passive mode where its location can be tracked, or in an active mode where it checks and communicates its own location. The GPS may be fit as part of the ρCoin-Frame, and be used in various tracking and security protocols. This feature will give the issuing store the power to monitor the distribution of its minted coins. The store is naturally interested in wide distribution so that more and more people will gravitate to the issuing store.

Comparing the $Φ$ Coin to a Regular BitMint Coin

A regular BitMint coin is designed to be autonomously split by its holder. The ρCoin cannot be split. Alas, one can connect, string together several independent ρCoins to a string-ρCoin, and separate each constituent coin for separate payment. For example, a string-ρCoin will be comprised of 100 $10 ρCoins. A total sum of $1000 than be can be paid to different payees and different times at a resolution of $10.

Leveraging the Secure Physical Coupon to a Viral Loyalty Effect

State currency spreads virally on account of its universal trust. Alas, today's mega corporations command deep public trust (see the stock market), which they can leverage to upgrade their brand of currency to a pseudo-generic coin and thereby dominate the wallets of the buying public. To break in, the minting store will have to offer the most efficient, most secure, most convenient digital money system. This patent application describes methods and procedures to achieve this aim.

Digital money sweeps the land—nascent, immature, vulnerable, and of many faces—but the underlying concept is solid and revolutionary. Physical cash is out, digital cash, in one from or another, is the way money works. A million developers worldwide are busy figuring out how exactly to make it happen. The voices of this revolution have reached the staid castles of central bankers around the world, and they have recently, with not much enthusiasm, turned around to examine what this technology means, and how to handle it. But the public does not wait for the ponderous central bankers, the new technology is here, and if the state does bot mint its money in the new platform then someone else will.

This someone else is business. We see large corporations around the world busy planning and minting their own currency, to take advantage of the new technology. In fact they are in competition with each other, in search of the best way to deploy digital money technology to promote the enterprising corporation.

This presentation is a description of a proposed methodology, proposed strategy to exploit the technology of secure physical coupons and take the lead in this race, and to be the leading factor in minting corporate (or store) secure physical coins.

The idea of a pseudo-generic loyalty currency emerges from the long familiar concept of loyalty money—forms of valuation recognized by a particular store as valid cash equivalent, under some prescribed terms, for purchases in this store. Known as "points", "credits", "coupons" or "air miles" these carriers of value amount to a private currency. Now the idea is to let these private currencies shed off their 'privacy' gown and rise to become pseudo-generic.

We describe the objective state, then the VLC principles.

The Objective State

We describe herein the objective state of the Viral Loyalty Cash (VLC) from the point of view of the merchant, the store, that mints and distributes the VLC. That is the state where the public comprised of prospective customers holds its liquid assets as that store loyalty money—at a ratio commensurate with the public buying capacity from that store. The larger the store, the larger the desired proportion claimed by that store loyalty currency within the wallet of the relevant public.

VLC Principles

The principles of the VLC strategy are (i) using a superior payment and currency technology to draw the buying public to keeping in their wallet store loyalty money such that whenever the need arises to purchase anything the store can provide—that store will be the default choice. And to (ii) use modern payment and currency technology to establish a productive relationship between the store and the members of the public, to induce the public to buy from the store and benefit from such purchases.

Drawing the public to hold store loyalty money in their wallet is effected through minting store money that is functionally very close to generic (state) cash. The minting store will have only a slight advantage in disposing of that money. This is in diametric contrast to the prevailing strategy over loyalty money—to make as "cash-unlike" as possible, burden it with a heap of rules, use restrictions, give it, and take it, in almost a whimsical fashion. The VLC strategy calls for loyalty money to be as cash like as possible, be allowed to be used everywhere cash is used, and be convertible to fiat currency (state cash) with a carefully managed exchange fee.

Once the store loyalty money becomes a recognized means of exchange of value, then the store can push its store money to distribution centers, which in turn will distribute the loyalty currency around as desired. These distribution centers are enterprising existing customers who will be lured to accept loyalty currency for purpose of distribution to their sphere of acquaintances. The cumulating of such spheres of acquaintances will facilitate the viral mechanism of distribution for the loyalty money.

We call for reversal of the trend. Instead of piling on particular restrictions, let the loyalty money be regarded first as 'good as cash' for every purchase within the minting store, and second as redeemable for cash with a certain conversion penalty—giving the loyalty money the standing of regular cash bill.

Definitions

Viral Loyalty Cash (VLC)

A digital entity (string of bits) which may be embodied in a secure physical coin, such that that it carries both value and identity, and is tethered to rules of trade and terms of redemption, and that is regarded (with some minimal restrictions) to be cash-equivalent for all purchases made in the store that mints the VLC. The VLC is cash-reversible against a specified exchange fee.

VLC Coins

VLC coins are denominated units of VLC. They may be minted as a physical coin with any denomination, and hence hand deliverable from one holder to the next. The fundamental idea here is that unlike credit card payment, or bitcoin payment, or PayPal payment—paying the VLC in the form of a secure physical coin requires no mutual identification of payer-payee. It is really cash-like with regard to ease of payment. But different from Cash in as much as the secure physical coin is tethered to redemption constraints.

The VLC Store

The VLC store, or the "store" or "merchant', or a network of stores that mints, hands-out, delivers, and distributes the VLC, supervises its trade, and eventually redeems it.

Existing Customer

An Existing customer is a customer of the VLC store, for whom the store has phone number, email address, and/or any other means for reaching out.

Latch Pack

A pack of two VLC coins, one the "carrier" and the other latched to it, the "latch". The holder of the coin can de-latch, disengage the coins. One objective is to distinguish between the use terms of these two coins. The carrier may be used by the recipient, and the latch by anyone other than the recipient.

VLC Traders

Traders—people usually, but also organizations—who accept, store and pay with VLC coins.

Cash Redemption Agent

A contracted agent, authorized to redeem VLC under the specified terms of redemption

Coalition of VLC

A group of stores binding together to issue a single digital loyalty coin that is honored by all members of the group.

Loyalty Bank

A bank serving a group of merchants uniting for the purpose of offering the public a loyalty coin honored by all group members.

VLC Operation

VLC operation is comprised of (i) priming, (ii) spreading, (iii) closing. A store (merchant) planning to operate the VLC procedure will first go through priming—the process of pushing VLC coins to its existing customers. It will then engage in spreading the VLC coins to traders who are not its customers, and in that mode operate until for any reason the store decides to terminate the operation and then it initiates the VLC closing procedure.

Priming

Priming is the operation in which the VLC store pushes VLC coins into the hands of its existing customers. There are several ways for doing so:

1. Initiated Giveaway 2. Discount Conversion 3. Special Offers

A store can simply use email accounts, or phone numbers to send a digital coin to its customers. In discount conversion the store effects discounts not through collecting less money from its customer, but rather through collecting the full pre-discount amount, and in parallel giving to the customer the discount amount in form of digital coin. Special offers are all sort of combination cases where if the customer behaves in a certain way he is rewarded with a certain amount of VLC coins.

Spreading

In spreading the Stores works in two modes:
1. Direct Promotion 2. Viral Expansion In direct promotion the store advertises in various means in order to lure more people to sign up as registered existing customers, offering VLC coins as inducement. In viral expansion the stores relates to its existing customers as focal points for viral distribution based on the contact list of each customer.

Viral Expansion

Viral expansion works by pushing a coin package to an existing customer, then motivating the customer to push parts or whole of the package to a contact of his or her, so that this contact ends up as a customer of the store.

In order to motivate the existing customer to find new customers the store will use one or few of the following methods:

1. Reward for Success 2. Coin Sharing 3. Cash Redemption 4. Coalition

When an existing customer passes on a VLC coin to a contact of his, and that contact uses the given coin with the store (becomes a customer), then the store notes (by the identity of the coin) that the existing customer has done what the store wished him to do, and for that the customer is rewarded, likely with a new loyalty coin for the customer's use with the store. In addition the store can pass to the existing customer a coin of some denominated value V, and limit the redemption of the coin to other than the existing customer. The existing customer, unable to use this coin by himself, is motivated to find someone to pass the coin to, and the store would encourage the existing customer to 'sell' this coin for a price U<V. By so doing the existing customer will gain U and the recipient who uses the coin will benefit in the amount V-U. Such revenue sharing may be carried out together with reward for success. The store will fine-tune its incentives depending on the response of its existing customers.

Normally loyalty money in its various forms shares one attributes. It redeems only against merchandise, not against cash. The idea here is to reverse this strong trend, and allow cash redemption. A VLC coin of value V will be redeemable against a cash value W<V. The difference (r=V−W) will be regarded as the redemption fee. The value of W (and r) will have to be well managed to balance between competing aims: (i) insure that the value captured in the coin is taken as purchase power for the minting store, and (ii) motivate the public to stuff their wallets with these loyalty coins. The normal case for loyalty money today is W=0, no cash redemption. The other extreme: W=V will motivate holders of these loyalty coins to convert them all to raw cash and escape the limitation of the loyalty currency. The life time of the average loyalty coin will be close to zero. This will cancel any advantage gained by the VLC enterprise. The store would opt then to practice an optimal cash redemption strategy.

The minting store could reach agreement with complementary businesses to jointly honor the store loyalty coins, and adjust a fair accounting in the background.

Reward for Success

We discuss two modes for reward for success:
1. Apriori Reward 2. Reward-Per-Proof The store may use the Latch Pack comprised of a carrier loyalty coin to be used by its existing customer, and a latched coin to be used by other than that customer. The first coin will be an a-priori reward for the expecting action to be taken by the customer—passing the latched coin to a new customer. Otherwise, or in addition, the store will monitor the use of the coins, and when the latch coin is used by a qualified buyer, the store makes a record of it and pays the existing customer with more loyalty coins. The payment can be proportional to the amount spent by the other customer, and also reflect the number of people that use the loyalty money distributed by a particular customer. We recall that the loyalty money in BitMint form allows the holder to divide the coin at any desired resolution, so the customer can enlist a large number of new customers to be given the coin, or a part thereof. Since the more customers are registered with the store, the better for the store—the store will encourage customers to cut their loyalty coin to as many recipients as possible—and will compensate these customers accordingly.

Reward per proof can also be fine-tuned. The store may indicate to the customer that mature adults are more desired new customers than young adults, females more than males, and any other grouping. The reward will reflect such store preference. The reward may grow with accomplishment. The more new customers a customer brings the greater his reward per customer—to keep the supply of new customers growing.

One concern in this procedure is the risk of fake identity fraud. Existing customers may pose as new customers and enjoy the benefits of the offer. The store will have to put forth sufficient precautions to insure that whoever is registering as a new customer is indeed new.

Coin Sharing

The loyalty coin forwarded by the store to the existing customer as a means to recruit a new customer will normally go to the new customer as full gain of the denominated value of coin, V. However, the store may opt to reward its existing customer for facilitating this acquisition of the new customer, and do so by sanctioning him or her selling the loyalty coin for a price U<V thereby reduced the benefit to the new customer from V to V−U.

Such sale can be carried out, of course, without the store knowing about it, but it can be extended into a loyalty exchange market place, which may be assisted, even operated by the store.

Such marketplace will be stable and honest on account of the guaranteed security The store may advertise to the public that some of its existing customers have been given loyalty cash, which is limited for use by a new customer, so the existing customers cannot use these coin. They are therefore interested in selling them. The price will be determined by the marketplace, by supply and demand, by the balance between the people wishing to buy such coins and the people willing to sell them. The balance will apply individually to each type or class of loyalty coins. Of course if all loyalty coins are good as cash regardless of what is purchased then there is only one class of coins. But if the store chooses to impose some measure of limitations, and dictate particular terms of use, like what must be purchased, and during what window of time, then there is more than a universal type of loyalty coin, and each type has its own market. The price may be set much like for the regular stock market, and changes will be real time based on supply and demand.

The market for coin sharing can also be done on smaller scale, by advertising offers or willing to buy on social media, Individuals may advertise on the bulletin board at work etc.

Cash Redemption

Cash redemption may be the most powerful means to achieve the goal of spreading loyalty cash into the wallets of the public. The general idea is to keep a very carefully engineered gap between the use of the loyalty coin for purchase within the minting store and generic cash. If the gap is too small then there will be no advantage for the store. If the gap is too large then the loyalty coin will not spread much. The exact value W for which a loyalty coin of value V is redeemed is an object of careful management, incorporating many factors.

We discuss a few options:
1. Designated Cash Redemption Centers 2. Life Time Dependent Redemption 3.
Redemption History Rates A rich variety of combinations of these three methods provides room for optimization. The store could insist on capturing communication details for every redeemer, to make it a target for future campaigns to render him or her into a customer.
Designated Cash Redemption Centers:

The store may contract assorted merchants to be cash-redemption qualified. Namely they would be able to redeem a store loyalty coin of value V for a price W very close to V. This privilege will not be given to others. Such privilege will make these merchants agreeable to be paid their own bills with the store loyalty cash—since they can readily redeem this money. What is more, if the redemption fee $r=V-W$ is smaller or competitive with the price charged by the alternative methods of payment, mainly card networks, and modern wallets, then these merchants will encourage their customers to pay with store loyalty money.

The more merchants that sign up to be qualified cash redeemers, the more attractive the loyalty coin to its holders. They can use it in a generic way. So although ordinary folks will not be able to exercise cash redemption, at least not in the favorable rates reserved for signed up merchants, the fact that the coins are acceptable widely makes them a welcome dweller in the public's wallets.
Life Time Dependent Redemption:

A loyalty coin may be cash redeemable at a rate W(t) where t is the time that lapsed since its minting. In the regular implementation this will be a situation where $W(t') \leq W(t'')$ for $t'<t''$. This is designed to keep the loyalty coin in the wallet for longer, since it will gain in value as time lapses. And in that time the holder of the coin might see an opportunity to use the coin to purchase something from the minting store at full denominated value. The store could try various pattern for the W(t) function in order to optimize its benefit.
Redemption History Rates:

The store could account for the redemption volume of particular redeemer. And assign a redemption value accordingly: W(q), where q is the measure of redeemed coins since some reference time point. In the basic way we will have $W(q') \leq W(q'')$ for $q'>q''$. The idea being to discourage coin holders from redeeming them into cash. A customer who redeemed a lot will be motivated to pass the coin to someone else who could redeem the same coin for better terms.

Coalition

The difference between a nominal loyalty coin and regular cash is the range of acceptability. The latter—everywhere, and the former only by the minting store. By expanding the acceptability of the loyalty coin, this distinction will shrink and the loyalty coins will be increasingly more acceptable in the public wallets. This leads to the strategy of coalition—bringing several stores (merchants) together to honor the same loyalty coin. Coalition can be achieved in the case where the loyalty coin is issued against cash received. It is problematic when issued as an inducement or as a reward without the store being paid by the customer the denominated value of the coin.

We discern then between:
1. Cash-Collected Loyalty Coins 2. Store Liability Loyalty Coins The first is the case where the store collected the denominated value of the loyalty coin from the recipient of the loyalty coin, and the latter is when such exchange did not take place. A store liability coin does not lend itself to coalition because the store issuing such coin will have to shell out its denominated value to the loyalty bank, which may end up being paid to another store. Cash collected coin will give the minting store the cash collected from the customer, which it can then give out to the loyalty bank. If that money ends up being paid to another store, it is equivalent to the minting store giving the customer real cash instead of the loyalty coin, no harm done. It is true that the minting store supports the recipient store, but presumably this will work in reverse too. A healthy coalition is comprised of stores which all contribute fairly to the market of coalition coins, namely each in proportion to its market volume, or based on a similar metric. The idea of a coalition is that it benefits all the participating stores because it drives consumers to shop within the group.

Use can be tethered in many ways. It is possible to restrict the users (redeemers) of coalition coins, as well as the applicable merchandise, and also time of use.

A coalition will be very useful for groups comprised of small businesses. Because the businesses are small they do not command the level of trust commanded by big business. The public will be very leery about holding substantial amounts of money in the form of a loyalty coin of a small unreliable store. However if this store is part of a group, served by a reputable bank, then the way the coalition works, the responsible party is the bank, and as long as the loyalty bank commands trust, the coalition can be comprised of low trust businesses. In fact, even a group of one member, can run such a coalition mode operation, simply in order to use the loyalty bank to project trust on the people who would consider holding that store's loyalty money in their wallet.

Cash Collected Loyalty Coins:

A Cash collected loyalty coin is the case where the value of the loyalty coin was collected from the recipient of the loyalty coin. This happens when the store announced a discount on a given product or service. The discount is for a value V. Therefore the price of the merchandise will be changed from X to X−V. Ordinarily the store would collect X−V against the merchandise. But in the loyalty coin paradigm the store collects the full amount X and issues a loyalty coin valued V to the buyer. In that case the store collected the dollar value of the loyalty coin, and will not lose any money even if the loyalty coin is redeemed against cash.

We consider now a group of n stores: $S_1, S_2, \ldots S_n$. In the first case each store issues its own loyalty money: $L_1, L_2, \ldots L_n$, and the n loyalty coins operate in parallel, competing for room in the public wallets. The multiplicity of these coins is quite confusing to the public that has to manage this complexity.

We now consider the case where this group decides to join forces and issue one group coin $L_0$ that would be honored by each store in the group. To do so they agree on a "Loyalty Bank". Each store will send to this bank the digital image of the digital coin it issued to its customer, and the money it collected from the recipient of the loyalty coin. The recipient will be notified that the loyalty coin he received is valid in every store that is a member of the group of n stores.

Let's consider customer Alice buying from store $S_i$ an item priced X, at a discount price of X−V. (i=1, 2, . . . n). In one case Alice pays X and receives a loyalty coin $L_1$=V, which is good for purchase at store $L_i$. But in another case Alice receives loyalty coin $L_0$=V, which is valid for purchase at any other store within the group. Alice, at some later point wishes to make a purchase at store $L_j$ (i≠j). She submits the loyalty coin to the store $L_j$ and asks for it to be regarded as cash in the amount V. Store $L_j$ will send the digital loyalty coin to the loyalty bank. The loyalty bank will check that the digital coin is valid. That is it was properly issued (by store $L_i$) and was not used (claimed) before. If all checks out, the loyalty bank OK's the submitted loyalty coin, $L_0$, and passes to store $L_j$ the cash in the amount V, which store $L_i$ deposited with the bank beforehand. Once store $L_j$ receives the money from the bank, it releases the merchandise to Alice.

In summary we have here a loyalty coin that was issued by store L and was redeemed by store $L_j$. Neither store lost in the deal because the loyalty coin was originally issued against collected cash.

The same procedure will apply if Alice passed the loyalty coin to Bob, and Bob to Carla and so on. (recalls that using the BitMint paradigm every trader can split the loyalty coin anyway they wish).

Functional Design of Coalition Loyalty Currency:

In a nominal BitMint design the mint and the redemption centers are one and the same. In the coalition arrangement the participating stores are minting the coins and the loyalty bank is handling the coin redemption decisions. The BitMint coalition coin carries the coalition project id, and the id of the store that mints the coin. Thereby there is no risk that two different stores will mint identical coins. Each store will use the normal BitMint mechanism to insure that it does not mint two identical coins. A store might keep a copy of its minted coin for security and accounting but it is not necessary. All the accounting and the management of the money is carried out in the loyalty bank.

The group could also keep all minting and redemption functions within the loyalty bank. In that case every time a store wishes to issue a group loyalty coin, it will indicate the sum and terms to the loyalty bank, which in turn will send the coin to it, properly minted. The loyalty bank will then redeem the coin when it comes to it.

Type of Coalition:

Any collection of stores may join into a coalition. Some options:

1. Neighborhood Promotion 2. Shopping Center Promotion 3. Joint Holding Company Ownership 4. Vertical and Horizontal Association 5. Meeting Another Coalition Challenge 6. B2B Coalitions A suburban area wishes to promote its businesses which are in competition with a near by metropolitan area. The area will then initiate a coalition among the stores in the area and push the "area cash" valid throughout the neighborhood, but not outside. Some tax payment money can be used to prime the operation.

Shopping centers are dying under the assault of online commerce. A mall-wide in-store limited purchase will attract shopping to the dying mall.

Several unrelated businesses owned by the same holding company may join together in a coalition, and in that case it matters not if every store contributes fairly to the whole.

Coalition makes sense if the customer's need are helped by associated merchants. A typical package offer of assorted products and services will quality for a coalition solution. E.g. flight-ground transportation-hotel accommodation, and entertainment package. It's a case of different vendors but related consumer experience.

If a business environment is threatened by a rising aggressive coalition then the left out business will have an incentive to unite into a counter coalition to stay alive.

The coalition advantage is also applicable to business. A collection of suppliers may approach a business with an offer for the business to commit to purchase form this group of suppliers for a given period of time, and in return to enjoy a specified discount over list price. The discount will be given as coalition loyalty currency redeemable at any of the group stores.

Coalition Cash Redemption:

Coalition cash redemption takes place through the loyalty bank. The redeemer may approach the minting store, demanding redemption against cash. The minting store will evaluate the redemption fee (V−W), and send the coin with its evaluation to the loyalty bank. The bank, in turn, will check if the coin is good to be redeemed (genuinely minted and not yet redeemed), and if it checks out, it will pass the redemption rate W to the minting store. The minting store will then pass W to the redeemer. Alternatively the loyalty bank may be the one evaluating the value of W.

Small Business Solutions

Small businesses do not command the trust for the average consumer to take their loyalty cash as cash equivalent. To resolve this issue the small business could mint cash equivalent loyalty money under the auspices, and the guarantee of a larger business, a bank or a similar financial institution. The coin will bear the cryptographically secure certificate of the trust agent to gain the customer's trust.

The trust giver agent will not take risk. In order to guarantee any loyalty coin, it will need to get the denominated amount in cash from the client small business. If the coin returns to the business, it sends it up to the agent and gets back the deposited cash. If the coin is claimed by another business, the request goes to the trust providing agent, that checks the coin if it is bona fide, and then pays it off from the money deposited by the served business.

Closing

This VLC operation has to be planned for termination. There are several reasons to opt to terminate such a program: there may be a better idea waiting to replace it, there are some unexpected difficulties and liabilities, there is a change in law or regulation that requires termination. To terminate a VLC program, it is necessary to insure that all the coins come with an expiration date. They would not be tradable after that date, except through some exceptional procedures.

Closing should be well advertised and announced quite ahead of time to allow coin holders to adapt.

SUMMARY

This invention is based on a new technology to mint coupons and loyalty currency in a format that will maintain the hand-deliverability of the coupons, while providing top notch security that will allow merchants to mint physical coupons with high denomination of store credit, not concerned of fraud or counterfeiting. This combination of paying money cash-like, with no need to identify the payee, nor to identify the payor, and the super security offered by the essential technology in this invention, creates opportunities that are not present today, not available to stores and merchants. The robust security of the physical coupon will be the basis of endless creative and imaginative ways for merchants to lure more customers to their outlets. The novelty herein is re-imagining coupons as a physical entity, physically coin-like.

Review of the Technology

We present here a system used by a merchant to mint store coupons through secure physical embodiment, which can be handed over from person to person, to promote the store business, comprising: (i) a physical secure coupon, (ii) a coupons accounting system, (iii) a coupon mint, (iv) a coupon authenticator, and (v) a coupon server verifier, where in the physical secure coupon will be built with randomized features that would assign it a unique identity to be recorded the coupon server identifier, the physical secure coupon will be marked per its nominal value and marked per its use limitations, the coupon accounting system will manage the quantities and dispositions of the issued physical secure coupons, the coupon mint will manufacture the physical secure coupon in the desired denomination, inscribed with any desired use limitations, the coupon authenticator will be physically applied to the physical secure coupon and measure its features, and compare these measurements to the record kept in the authenticator for this coupon, or coupon authenticator will engage the coupon server verifier, to compare the measurements to the records for this physical secure coupon, and verify the physical secure coupons if the measurements agree with the stored record for that physical secure coupon. the coupon server verifier will establish on-line communication channel to respond to query from the coupon authenticator and communicate the the coupon authenticator the stored record of the features of the examined secure physical coupon.

The system defined above has one embodiment where the features of the secure physical coupon are conductivity readings between randomized points in the body of the coupon, comprising randomized arrangements of blocks of several materials of varied degree of electric conductivity each such that the reading of the effective conductivity between two randomized points in the physical coin depends on the randomized location of these points and the randomized arrangement of blocks of materials that comprise the body of the coupon.

The system may be one where the security of the coupon can be increased by increasing the number of randomized points inside the coupon and by increasing the number of conductivity-variant materials, and by increasing the span of conductivity ratings of the constituent materials, and by increasing the size of the secure physical coupon.

The system may also be implemented using measurement data of the secure physical coupons as captured through blockchain technology, creating a trusted public ledger, accessible by any potential payee, to retrieve with confidence the pre-measurements of the secure physical coupon to be compared to ad-hoc measurements of the presented secure physical coupon.

The invented secure physical coupon enables a method to use secure physical coupons by attaching several of them of varying denominations on a coupon board to be handed out to customers and prospective customers, such that the recipients of these board can easily remove one or more secure physical coupons and give them to others, as a gift, or against an item or service of value.

What is claimed is:

1. A system configured for a store or merchant to mint or produce store or merchant handheld coins, which are physically exchanged from the store or merchant to a person, the person to the store or merchant, the person to another person, any person in general to any other person in general, a recipient, or between any person in general and any store in general in order to promote the store or merchant's business that minted or produced the handheld coins, comprising:
at least one or more secure physical store or merchant handheld coins, where each coin carries an image comprising its identity, specific features and nominal value;
at least one or more store or merchant's handheld coin minting or production equipment;
at least one or more store or merchant's handheld coin minting or production accounting system;
at least one or more store or merchant's handheld coin authentication device;
at least one or more store or merchant's handheld coin verification server;
where the at least one or more secure physical store or merchant handheld coins are constructed with randomized features that assign each of the at least one or more secure physical store or merchant handheld coins a unique identity or signature, the image of each secure physical store or merchant handheld coin recorded and stored in a database residing in the handheld coin minting or producing store or merchant's handheld coin verification server, the secure physical store or merchant handheld coin marked or inscribed when minted or produced with the secure physical store or merchant handheld coin's assigned unique identity or signature, assigned nominal monetary value, and assigned limitations of use;
where the quantities and dispositions of the issued secure physical store or merchant handheld coins are managed by the at least one or more store or merchant's handheld coin minting or production accounting system;
where the at least one or more store or merchant's handheld coin minting or production equipment mints, produces, or manufactures each secure physical store or merchant handheld coin in a desired denomination equal to each secure physical store or merchant handheld coin's nominal monetary value, inscribes this desired denomination on the surface of each secure physical store or merchant handheld coin, and stores this desired denomination in both the at least one or more store or merchant's handheld coin authentication device and the at least one or more store or merchant's handheld coin verification server;

where in addition to the inscription of each secure physical store or merchant handheld coin's assigned denomination on the surface of each secure physical store or merchant handheld coin, the at least one or more store or merchant's handheld coin minting or production equipment also inscribes on the surface of each secure physical store or merchant handheld coin the secure physical store or merchant's assigned limitations of use and assigned unique identity or signature for each of the secure physical store or merchant handheld coins as defined by the store or merchant, and stores these limitations of use and assigned unique identity or signature in both the at least one or more store or merchant's handheld coin authentication device and the at least one or more store or merchant's handheld coin verification server, with each handheld coin's assigned unique identity or signature tied to each handheld coin's desired denomination and assigned limitations of use;

where the at least one or more store or merchant's handheld coin authentication device is physically applied to each of the secure physical store or merchant handheld coins to take a measurement of its assigned unique identity or signature, assigned nominal monetary value, and assigned limitations of use, then compares these taken measurements to measurements previously stored in the at least one or more store or merchant's handheld coin authentication device and/or the at least one or more store or merchant's handheld coin verification server, a comparison match indicating that the secure physical store or merchant handheld coin under measurement is authentic; and where in the case where the store or merchant's handheld coin authentication device under use is located in a different physical location than the store or merchant's handheld coin verification server which has stored data records for the particular handheld coin under measurement, an online communications channel will be opened between the onsite store or merchant's handheld coin authentication device and the remote store or merchant's handheld coin verification server, to obtain the necessary data records for remote onsite comparison and verification.

2. The system of claim 1, wherein the construction of each secure physical store or merchant handheld coin provides conductivity readings between randomized points on at least one or more sides of each secure physical store or merchant handheld coin, by further providing randomized arrangements of blocks of several different materials of varying degrees of electric conductivity located inside the interior of the handheld coin and accessible by the randomized points on at least one or more sides of the handheld coin, resulting in the reading of effective conductivity between two randomized measurement points on at least one or more sides of the secure physical store or merchant handheld coin depending on the randomized location of these external measurement points and the randomized arrangement of blocks of materials located internal to the handheld coin and that are electrically located between these external measurement points.

3. The system of claim 2, wherein the security of each secure physical store or merchant handheld coin is increased by increasing the number of randomized points on at least one or more sides of each secure physical store or merchant handheld coin, by increasing the number of randomized arrangements of blocks of several different materials of varying degrees of electric conductivity located inside the interior of the handheld coin, and/or by increasing the physical size of a secure physical store or merchant handheld coin.

4. The system of claim 1, wherein the measurement data of each secure physical store or merchant handheld coin is stored via direct distribution or via distributed ledger technology, creating a trusted public ledger that is accessible by any payee, that can be retrieved with confidence by any recipient of the at least one or more secure physical store or merchant handheld coins and compared to current measurements of a presented secure physical store or merchant handheld coin in verifying by any recipient of at least one or more secure physical store or merchant handheld coins the presented secure physical store or merchant handheld coin's authenticity.

5. A method involving a first store or merchant, store or merchant in-house issued handheld coins or digital coins, store or merchant customers, and store or merchant prospective customers, comprising:
  passing or transmitting, by the first store or merchant, to a first recipient, a customer, or a prospective customer, the first store or merchant in-house issued handheld coins or digital coins;
  committing, by the first store or merchant, to redeem the first store or merchant's in-house issued handheld coins or digital coins for cash at a specified lesser amount than the cash value of the first store or merchant's in-house issued handheld coins or digital coins if used to purchase at least one or more items for sale from the first store or merchant;
  tracking, by the first store or merchant, the first recipient of at least one or more of the first store or merchant's in-house issued handheld coins or digital coins;
  tracking, by the first store or merchant, a purchasing customer that used at least one or more of the first store or merchant's in-house issued handheld coins or digital coins to purchase from the first store;
  providing, by the first store or merchant, a reward to the first recipient of at least one or more of the first store or merchant's in-house issued handheld coins or digital coins if the purchasing customer is different than the first recipient.

6. The method of claim 5, wherein the first store or merchant's in-house issued coin is a digital coin which the recipient splits into multiple parts and shares at least one or more parts to at least one or more other recipients, resulting in an increased reward to the first recipient based on how many other recipients utilize the parts of the first store or merchant's in-house issued digital coin shared with them to purchase items at the first store or merchant.

7. The method of claim 5, wherein the first store or merchant redeems the first store or merchant's in-house issued handheld coin or digital coin for a higher cash value, based on an increased length of time between when the first store or merchant originally issued a handheld coin or digital coin and the time of its cash redemption.

8. The method of claim 5, wherein a second store or merchant accepts the first store or merchant's in-house issued handheld coin or digital coin, as payment for goods and merchandise sold by the second store or merchant, and then redeems the first store or merchant's in-house issued handheld coin or digital coin at the first store or merchant for cash, and also where the first store or merchant accepts the second store or merchant's in-house issued handheld coin or digital coin, as payment for goods and merchandise sold by the first store or merchant, and then redeems the second store or merchant's in-house issued handheld coin or digital coin at the second store or merchant for cash.

\* \* \* \* \*